US012224961B2

(12) United States Patent
Wong et al.

(10) Patent No.: US 12,224,961 B2
(45) Date of Patent: Feb. 11, 2025

(54) WIRELESS TELECOMMUNICATIONS APPARATUS AND METHODS

(71) Applicant: Sony Group Corporation, Tokyo (JP)

(72) Inventors: Shin Horng Wong, Basingstoke (GB); Martin Warwick Beale, Basingstoke (GB); Samuel Asangbeng Atungsiri, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 250 days.

(21) Appl. No.: 17/722,392

(22) Filed: Apr. 18, 2022

(65) Prior Publication Data

US 2022/0239444 A1 Jul. 28, 2022

Related U.S. Application Data

(63) Continuation of application No. 16/331,139, filed as application No. PCT/EP2017/071636 on Aug. 29, 2017, now Pat. No. 11,316,642.

(30) Foreign Application Priority Data

Sep. 15, 2016 (EP) .................................... 16189083

(51) Int. Cl.
*H04L 5/00* (2006.01)
*H04L 1/00* (2006.01)
(Continued)

(52) U.S. Cl.
CPC .......... *H04L 5/0053* (2013.01); *H04L 1/0025* (2013.01); *H04L 5/0044* (2013.01); *H04W 72/0446* (2013.01); *H04W 72/23* (2023.01)

(58) Field of Classification Search
CPC ........... H04W 72/0446; H04W 72/042; H04W 72/04; H04W 72/1289; H04W 28/06;
(Continued)

(56) References Cited

U.S. PATENT DOCUMENTS 11,316,642 B2 * 4/2022 Wong ................. H04W 72/23
2015/0334685 A1 11/2015 Ji et al.
(Continued)

FOREIGN PATENT DOCUMENTS

EP 3504914 8/2018
EP 3504914 A1 7/2019

OTHER PUBLICATIONS

Office Action issued on Oct. 30, 2020, in corresponding Taiwanese Patent Application No. 106125758, 17 pages with English Translation.

(Continued)

*Primary Examiner* — The Hy Nguyen
(74) *Attorney, Agent, or Firm* — XSENSUS LLP (57) ABSTRACT

A method of transmitting data in a mobile communications network, the method comprising transmitting first data to a first mobile unit wherein transmitting the first data comprises transmitting first control information in a first time period, the first control information identifying first allocated resources for transmitting the first data in a subsequent second time period. The method further comprises identifying second data to be transmitted to a second mobile unit in the second time period and, upon identification of the second data: transmitting the second data in second resources, wherein the second resources comprises a set of re-allocated resources selected from the first allocated resources, the second data being transmitted in a selected time period within the second time period; and transmitting second control information, the second control information notifying the first mobile unit of the transmission of data other than the first data in the set of re-allocated resources originally allocated for the transmission of the first data.

20 Claims, 6 Drawing Sheets

(51) Int. Cl.
*H04W 72/0446* (2023.01)
*H04W 72/23* (2023.01)

(58) Field of Classification Search
CPC ... H04W 72/12; H04W 88/08; H04W 72/048; H04W 72/1268; H04W 72/14; H04W 74/02; H04W 28/02; H04W 72/1263; H04W 74/006; H04W 88/02; H04W 8/22; H04L 5/0037; H04L 5/0091; H04L 5/1469
See application file for complete search history.

(56) References Cited

U.S. PATENT DOCUMENTS

| | | |
|---|---|---|
| 2016/0174238 A1 | 6/2016 | Chen et al. |
| 2016/0374060 A1* | 12/2016 | Lim ..................... H04W 72/23 |
| 2018/0035459 A1 | 2/2018 | Islam et al. |
| 2018/0063865 A1* | 3/2018 | Islam ................... H04L 5/0064 |

OTHER PUBLICATIONS

Holma et al., "LTE for UMTS", OFDMA and SC-FDMA Based Radio Access, System Architecture Based on 3GPP SAE, 2009, 11 pages.

ZTE et al., "Multiplexing of eMBB and URLLC", 3GPP TSG RAN WG1 Meeting No. 86, R1-166408, Gothenburg, Sweden, Aug. 22-26, 2016, 10 pages.

NTT Docomo, "New SID Proposal: Study on New Radio Access Technology", 3GPP TSG RAN Meeting No. 71, RP-160671, Göteborg, Sweden, Mar. 7-10, 2016, 8 pages.

International Search Report mailed on Nov. 15, 2017 for PCT/EP2017/071636 filed on Aug. 29, 2017, 13 pages.

* cited by examiner

FIG. 9

WIRELESS TELECOMMUNICATIONS APPARATUS AND METHODS

CROSS-REFERENCE TO RELATED APPLICATIONS

The present application is a continuation of U.S. application Ser. No. 16/331,139, filed Mar. 7, 2019, which is based on PCT filing PCT/EP2017/071636, filed Aug. 29, 2017, which claims priority to EP 16189083.5 filed Sep. 15, 2016, the entire contents of each are incorporated herein by reference.

FIELD

The present disclosure relates to wireless telecommunications apparatus and methods.

BACKGROUND

The present application claims the Paris Convention priority of European patent application EP 16189083.5 the contents of which are incorporated herein by reference.

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly. However, whilst fourth generation networks can support communications at high data rate and low latencies from devices such as smart phones and tablet computers, it is expected that future wireless communications networks will be expected to efficiently support communications with a much wider range of devices associated with a wider range of data traffic profiles, for example including reduced complexity devices, machine type communication devices, high resolution video displays and virtual reality headsets. Some of these different types of devices may be deployed in very large numbers, for example low complexity devices for supporting the "The Internet of Things", and may typically be associated with the transmissions of relatively small amounts of data with relatively high latency tolerance, whereas other types of device, for example supporting high-definition video streaming, may be associated with transmissions of relatively large amounts of data with relatively low latency tolerance.

There is therefore expected to be a desire for future wireless communications networks, which may be referred to as 5G or new radio (NR) system/new radio access technology (RAT), networks, to efficiently support connectivity for a wide range of devices associated with different applications with different characteristic data traffic profiles, resulting in different devices having different operating characteristics/requirements, such as:
  High latency tolerance
  High data rates
  Millimetre wave spectrum use
  High density of network nodes (e.g. small cell and relay nodes)
  Large system capacity
  Large numbers of devices (e.g. MTC devices/Internet of Things devices)
  High reliability (e.g. for vehicle safety applications, such as self-driving cars).
  Low device cost and energy consumption
  Flexible spectrum usage
  Flexible mobility
  Ultra-reliable and Low latency A 3GPP Study Item (SI) on New Radio Access Technology (NR) [1] has been proposed for studying and developing a new Radio Access Technology (RAT) for such a next generation wireless communication system. The new RAT is expected to operate in a large range of frequencies and it is expected to cover a broad range of use cases. Example use cases that are considered under this SI are:
  Enhanced Mobile Broadband (eMBB)
  Massive Machine Type Communications (mMTC)
  Ultra Reliable & Low Latency Communications (URLLC)

eMBB services are typically high capacity services with a requirement to support up to 20 Gb/s. For efficient transmission of large amounts of data at high throughput, eMBB services are expected to use a long scheduling time so as to minimise the overhead, where scheduling time refers to the time available for data transmission between allocations. In other words, eMBB services are expected to have relatively infrequent allocation messages and to have longer time period allocated to data transmission in-between allocation messages.

On the other hand URLLC services are low latency services, wherein the latency is measured from the ingress of a layer 2 packet to its egress from the network, with a proposed target of 1 ms. URLLC data is generally expected to be short such that smaller scheduling times are generally expected compared to eMBB transmissions. As the skilled person will understand, eMBB transmissions and URLLC transmissions have different requirements and expectation, wherein high capacity and low overhead is desired for one while low latency is desired for the other.

It is therefore challenging to conceive a system which can accommodate both needs and where these two very different types of transmissions can be transmitted in a satisfactory manner. In view of this, there is a desire to provide arrangements and system where high capacity and low latency transmissions can be communicated at the time while trying to optimise resources utilisation for the system as a whole and for each type of transmission.

SUMMARY

The present disclosure can assist addressing or mitigating at least some of the issues discussed above.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DESCRIPTION OF EXAMPLES

Figure 1:
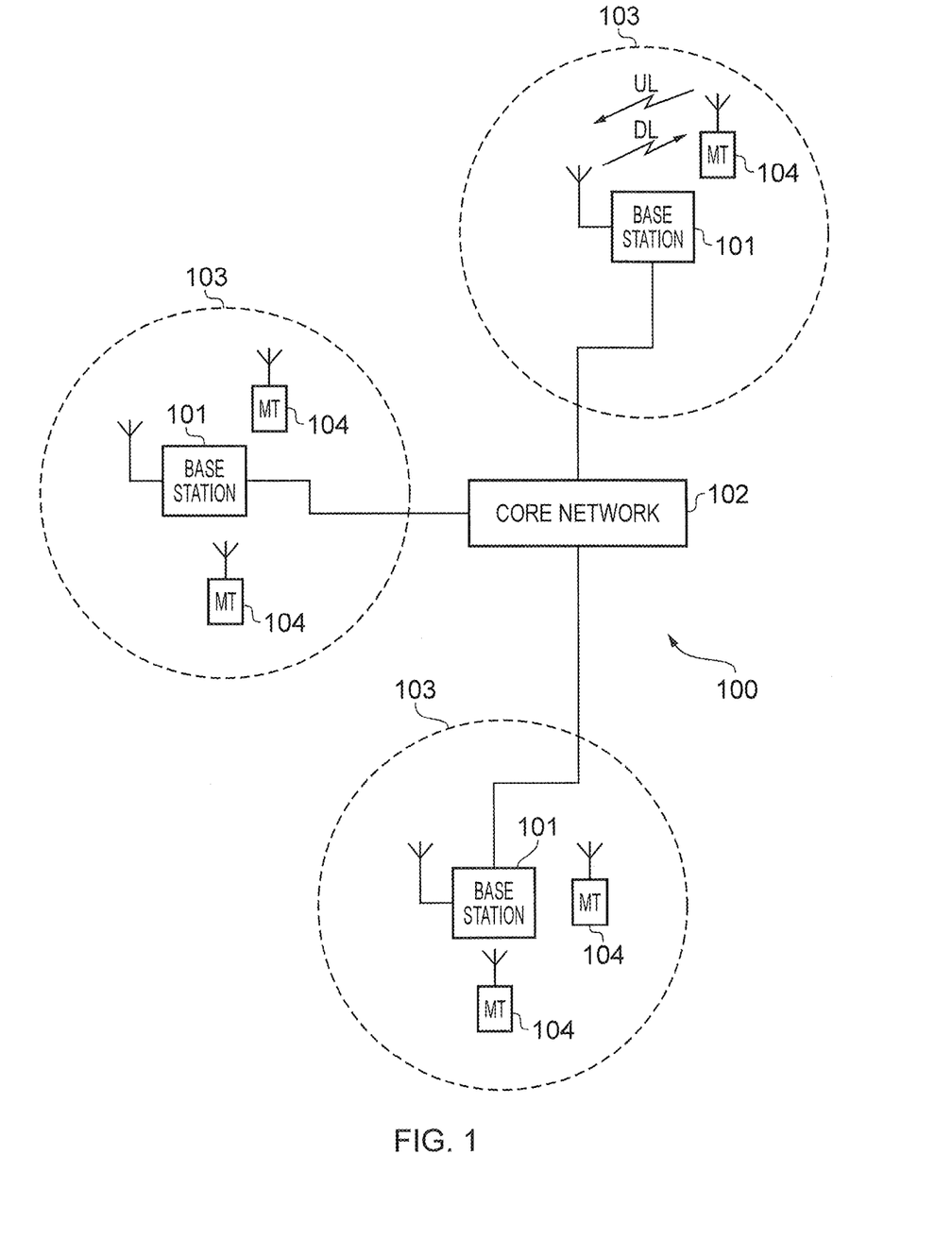
FIG. 1 schematically represents some elements of a conventional LTE-based mobile telecommunications network/system.

FIG. 1 is a schematic diagram illustrating a network architecture for an LTE-based wireless mobile telecommunications network/system 100. Various elements of FIG. 1 and their respective modes of operation are well-known and defined in the relevant standards administered by the 3GPP (RTM) body, and also described in many books on the subject, for example, Holma H. and Toskala A [2]. It will be appreciated that operational aspects of the telecommunications network represented in FIG. 1, and of other networks discussed herein in accordance with embodiments of the disclosure, which are not specifically described (for example in relation to specific communication protocols and physical channels for communicating between different elements) may be implemented in accordance with any known techniques, for example according to currently used approaches for implementing such operational aspects of wireless telecommunications systems, e.g. in accordance with the relevant standards.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The core network 102 routes data to and from the terminal devices 104 via the respective base stations 101 and provides functions such as authentication, mobility management, charging and so on. Terminal devices may also be referred to as mobile stations, user equipment (UE), user terminal, mobile radio, communications device, and so forth. Base stations, which are an example of network infrastructure equipment, may also be referred to as transceiver stations/nodeBs/e-nodeBs, and so forth.

Figure 2:
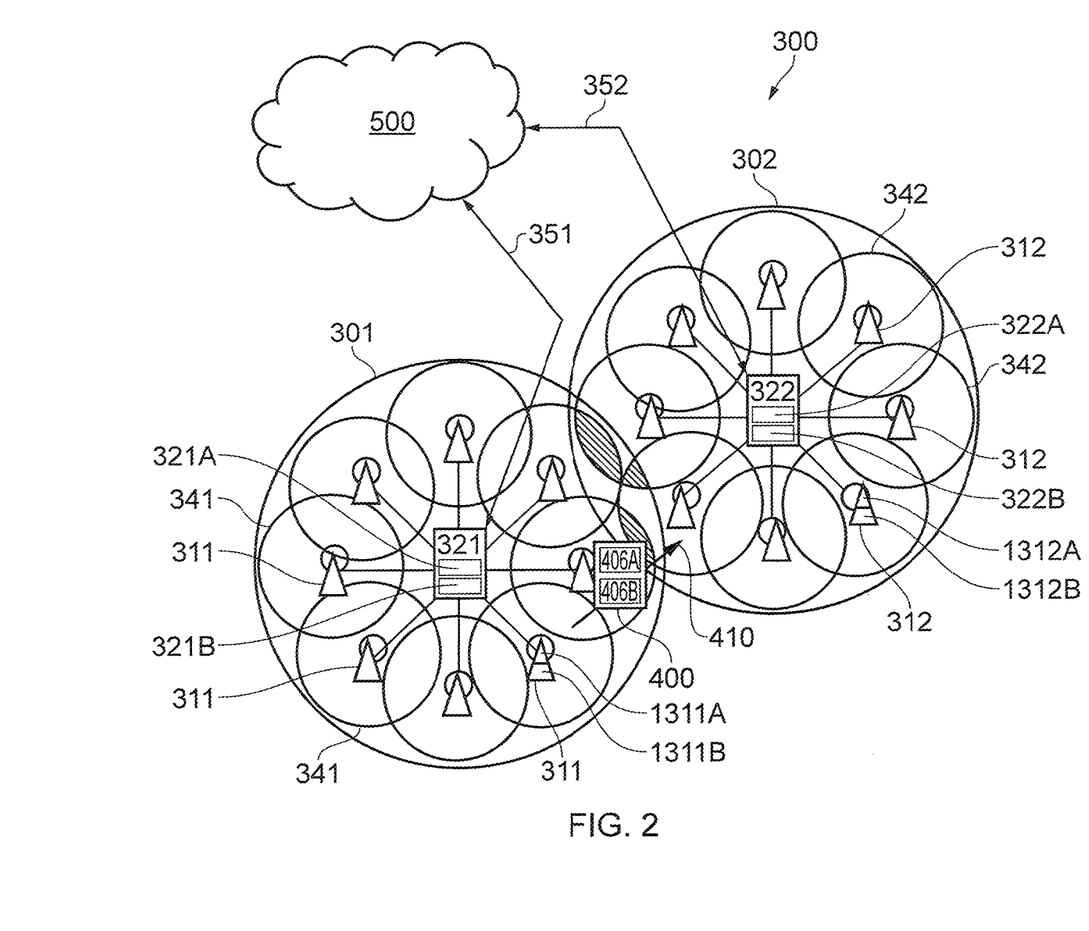
FIG. 2 schematically represents some elements of another type of wireless telecommunications network/system.

FIG. 2 is a schematic diagram illustrating a network architecture for a new RAT wireless mobile telecommunications network/system 300 based on previously proposed approaches and which may be adapted to provide functionality in accordance with embodiments of the disclosure described herein. The new RAT network 300 represented in FIG. 2 comprises a first communication cell 301 and a second communication cell 302. Each communication cell 301, 302, comprises a controlling node (centralised unit) 321, 322 in communication with a core network component 500 over a respective wired or wireless link 351, 352. The respective controlling nodes 321, 322 are also each in communication with a plurality of distributed units (radio access nodes/remote transmission and reception points (TRPs)) 311, 312 in their respective cells. Again, these communications may be over respective wired or wireless links. The distributed units 311, 312 are responsible for providing the radio access interface for terminal devices connected to the network. Each distributed unit 311, 312 has a coverage area (radio access footprint) 341, 342 which together define the coverage of the respective communication cells 301, 302.

In terms of broad top-level functionality, the core network component 500 of the new RAT telecommunications system represented in FIG. 2 may be broadly considered to correspond with the core network 102 represented in FIG. 1, and the respective controlling nodes 321, 322 and their associated distributed units/TRPs 311, 312 may be broadly considered to provide functionality corresponding to base stations of FIG. 1.

A terminal device 400 is represented in FIG. 2 within the coverage area of the first communication cell 301. This terminal device 400 may thus exchange signalling with the first controlling node 321 in the first communication cell via one of the distributed units 311 associated with the first communication cell 301. For simplicity the present description assumes communications for a given terminal device are routed through one of the distributed units, but it will be appreciated in some implementations communications associated with a given terminal device may be routed through more than one distributed unit, for example in a soft handover scenario and other scenarios. That is to say, references herein to communications being routed through one of the distributed units should be interpreted as references to communications being routed through one or more of the distributed units. In this regard, the particular distributed units through which a terminal device is currently connected through to the associated controlling node may be referred to as active distributed units for the terminal device. The active subset of distributed units for a terminal device may comprise one or more than one distributed units (TRPs). The controlling node 321 is responsible for determining which of the distributed units 311 spanning the first communication cell 301 is responsible for radio communications with the terminal device 400 at any given time (i.e. which of the distributed units are currently active distributed units for the terminal device). Typically this will be based on measurements of radio channel conditions between the terminal device 400 and respective ones of the distributed units 311. In this regard, it will be appreciated the subset of the distributed units in a cell which are currently active for a terminal device will depend, at least in part, on the location of the terminal device within the cell (since this contributes significantly to the radio channel conditions that exist between the terminal device and respective ones of the distributed units).

In the example of FIG. 2, two communication cells 301, 302 and one terminal device 400 are shown for simplicity, but it will of course be appreciated that in practice the system may comprise a larger number of communication cells (each supported by a respective controlling node and plurality of distributed units) serving a larger number of terminal devices.

It will further be appreciated that FIG. 2 represents merely one example of a proposed architecture for a new RAT telecommunications system in which approaches in accordance with the principles described herein may be adopted, and the functionality disclosed herein for handling mobility/handovers in a wireless telecommunications system may also be applied in respect of wireless telecommunications systems having different architectures. That is to say, the specific wireless telecommunications architecture for a wireless telecommunications system adapted to implement functionality in accordance with the principles described herein is not significant to the principles underlying the described approaches.

The terminal device 400 comprises a transceiver unit 400A for transmission and reception of wireless signals and a processor unit 400B configured to control the terminal device 400. The processor unit 400B may comprise various sub-units for providing functionality in accordance with embodiments of the present disclosure as explained further herein. These sub-units may be implemented as discrete hardware elements or as appropriately configured functions of the processor unit. Thus the processor unit 400B may comprise a processor unit which is suitably configured/programmed to provide the desired functionality described herein using conventional programming/configuration techniques for equipment in wireless telecommunications systems. The transceiver unit 400A and the processor unit 400B are schematically shown in FIG. 2 as separate elements for ease of representation. However, it will be appreciated that the functionality of these units can be provided in various different ways, for example using a single suitably programmed general purpose computer, or suitably configured application-specific integrated circuit(s)/circuitry. It will be appreciated the terminal device 400 will in general comprise various other elements associated with its operating functionality, for example a power source, user interface, and so forth, but these are not shown in FIG. 2 in the interests of simplicity.

The first and second controlling nodes 321, 322 in this example are functionally identical but serve different geographical areas (cells 301, 302). Each controlling node 321, 322 comprises a transceiver unit 321A, 322A for transmission and reception of communications between the respective controlling nodes 321, 322 and distributed units 311, 312 within their respective communication cells 301, 302 (these communications may be wired or wireless). Each controlling node 321, 322 further comprises a processor unit 321B, 322B configured to control the controlling node 321, 322 to operate in accordance with embodiments of the present disclosure as described herein. The respective processor units 321B, 322B may again comprise various sub-units for providing functionality in accordance with embodiments of the present disclosure as explained herein. These sub-units may be implemented as discrete hardware elements or as appropriately configured functions of the processor unit. Thus, the respective processor units 321B, 322B may comprise a processor unit which is suitably configured/programmed to provide the desired functionality described herein using conventional programming/configuration techniques for equipment in wireless telecommunications systems. The respective transceiver units 321A, 322A and processor units 321B, 322B for each controlling node 321, 322 are schematically shown in FIG. 2 as separate elements for ease of representation. However, it will be appreciated the functionality of these units can be provided in various different ways, for example using a single suitably programmed general purpose computer, or suitably configured application-specific integrated circuit(s)/circuitry. It will be appreciated the controlling nodes 321, 322 will in general comprise various other elements, for example a power supply, associated with their operating functionality.

The respective distributed units (TRPs) 311, 312 in this example are functionally identical but serve different parts of their respective cells. That is to say, the distributed units are spatially distributed through their respective communication cells to support communications for terminal devices at different locations within the cells, as schematically indicated in FIG. 2. Each distributed unit 311, 312 comprises a transceiver unit 1311A, 1312A for transmission and reception of communications between the respective distributed units 311, 312 and their associated controlling node 321, 322 and also for transmission and reception of wireless radio communications between the respective distributed units 311, 312 and any terminal device they are currently supporting. Each distributed unit 311, 312 further comprises a processor unit 1311B, 1312B configured to control the operation of the distributed unit 311, 312 in accordance with the principles described herein. The respective processor units 1311B, 1312B of the distributed units may again comprise various sub-units. These sub-units may be implemented as discrete hardware elements or as appropriately configured functions of the processor unit. Thus, the respective processor units 1311B, 13126 may comprise a processor unit which is suitably configured/programmed to provide the desired functionality described herein using conventional programming/configuration techniques for equipment in wireless telecommunications systems. The respective transceiver units 1311A, 1312A and processor units 1311B, 1312B are schematically shown in FIG. 2 as separate elements for ease of representation. However, it will be appreciated the functionality of these units can be provided in various different ways, for example using a single suitably programmed general purpose computer, or suitably configured application-specific integrated circuit(s)/circuitry. It will be appreciated the distributed units 311, 312 will in general comprise various other elements, for example a power supply, associated with their operating functionality.

As discussed above, mobile communications networks such as network 100 or network 300 may be used to carry transmissions for services with a variety of constraints, such as traffic which are high capacity and have some tolerance to delay and traffic which is low capacity but with a low tolerance to delay. While the principles of the disclosures will be illustrated in the context of a mobile network where a network element (e.g. TRP, eNB, BTS, . . . ) transmits eMBB and URLLC data to a mobile unit, it will appreciated that the same principles apply to 3G networks, LTE networks or any other suitable network and to any appropriate type or types of data. Likewise, the same principles and teachings can also be used for uplink transmissions from a mobile device to a network receiver (e.g. BTS, eNB, TRP, etc.).

Figure 3:
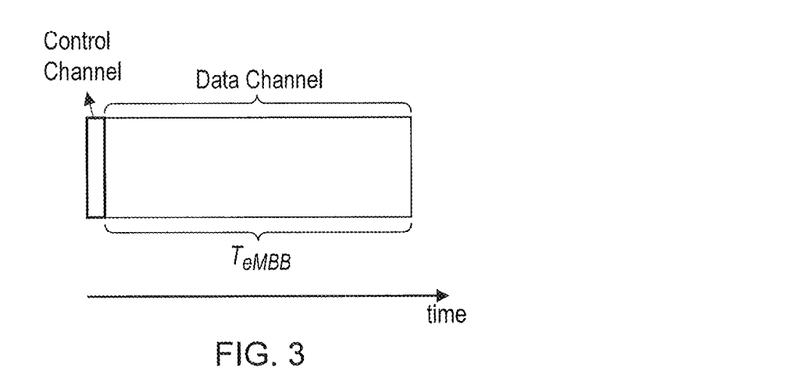
FIG. 3 schematically represents an example eMBB transmission in accordance with the present disclosure.
Figure 4:
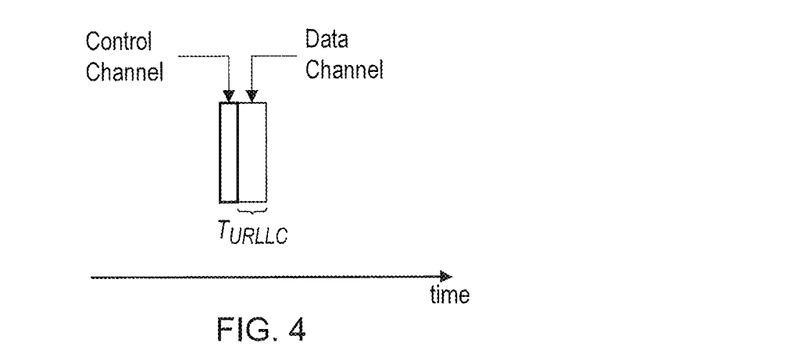
FIG. 4 schematically represents an example URLLC transmission in accordance with the present disclosure.

Returning to the example of eMBB and URLLC traffic, examples of suitable frame structure for sending eMBB data and URLLC data are illustrated in FIGS. 3 and 4 respectively. An example eMBB frame structure is shown in FIG. 3 with transmission period $T_{eMBB}$ (e.g. 0.5 ms, 1 ms, 5 ms, 10 ms or 50 ms), where the control channel uses significantly smaller transmission resources than that of the data channel. In this manner, the overhead caused by control transmissions is reduced. On the other hand, if new URLLC data to be sent is identified or received for transmission once the transmission of an eMBB frame has already started, it would have to be sent in a future frame which may lead to a delay in transmitting this data. Namely, the delay would be of at least the remaining transmission time for the current eMBB frame which may create a delay that is not acceptable to the URLLC transmission. Presented differently, as a trade-off for the lower overhead, the transmission delay for longer frames is increased compared to the transmission delay for shorter frames. This example eMBB frame is thus well adapted to the transmission of relatively high capacity and high delay tolerance traffic (e.g. streaming of video, web traffic, etc.).

Now turning to FIG. 4, an example of URLLC frame structure is illustrated with a transmission period of $T_{URLLC}$ (e.g. 0.25 ms), where the control and data channels occupy a short duration of time compared to the frame illustrated in FIG. 3. The transmission length of URLLC data $T_{URLLC}$ is expected to be much smaller than that of eMBB $T_{eMBB}$, that is, $T_{eMBB} \gg T_{URLLC}$. An example requirement currently considered for URLLC is a low latency transmission measured from the ingress of a layer 2 packet to its egress from the network, with a proposed target of 1 ms. With such a frame structure and compared to that of FIG. 3, the overhead created by the transmission of control information is greater but if new data is received during the transmission of a current frame, a new frame can be sent quicker (as the transmission of the current frame will finish earlier than for a longer frame) and thus the delay for sending data is relatively smaller. As the skilled person will appreciate, this type of frame is better adapted for sending low capacity traffic that is sensitive to delay (e.g. emergency and safety systems, health monitoring, etc.), in accordance with the expected low delay requirements for URLLC traffic, than for sending high capacity and high delay traffic.

In a mobile network, it is generally expected that the different services can be multiplexed in the same system bandwidth. That would mean that eMBB and URLLC traffic would be scheduled by the network in the same (time and/or frequency) resources and that the mobile unit receiving the transmissions should be able to find the relevant types of transmissions addressed to it. Possible options for multiplexing these different types of traffic and frames include:

- Orthogonal time resources multiplexing. Here the base station uses a scheduling interval that is short enough to meet URLLC latency requirements for both the eMBB and URLLC to allow URLLC and eMBB to be scheduled on orthogonal transmission resources. One disadvantage of this approach is that it creates a relatively large amount of scheduling-related overhead for the eMBB thereby significantly reducing its spectral efficiency. Another option would be to reserve some time periods for URLLC transmissions. On disadvantage would be that the amount of reserved resources would have to be overestimated to try to ensure that resources are always available for URLLC transmissions (with a view to meeting the delay targets) which is likely to result in a sub-optimal use of available resources and thus a loss of capacity for the network (which in turn would translate in a loss of capacity for eMBB traffic as well).
- Orthogonal frequency resources, where eMBB and URLLC use different frequency resources. One drawback is that, as when reserving time resources for URLLC (see above), this is likely to result in a reduced overall capacity for the network. Also, in some systems, such as NR or 5G systems, orthogonal frequency resource may not be available because the network can sometimes be expected to serve many users and to occupy a large portion of resources for eMBB transmissions for a relatively long time.

Figure 5:
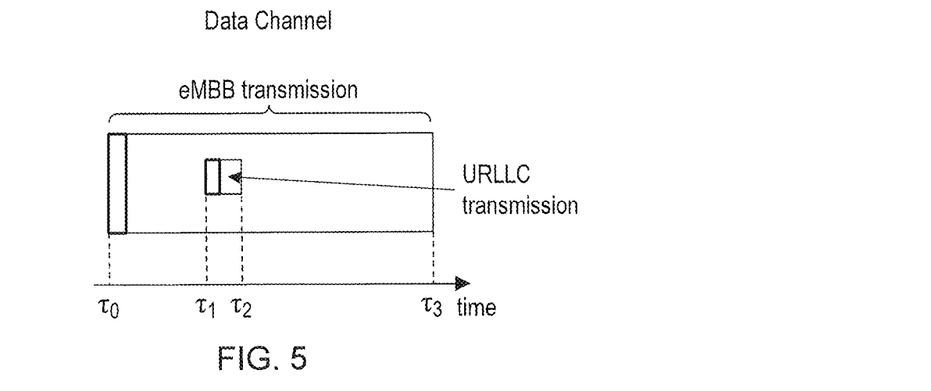
FIG. 5 schematically represents an example multiplexing of eMBB and URLLC transmissions.

With a view to providing multiplexing of URLLC and eMBB transmissions in a manner that aims at providing a low latency URLLC transmission, another option is to occupy a subset of resources already allocated to eMBB for sending URLLC data. This is illustrated with reference to FIG. 5, where an eMBB transmission started at time τ0, and is expected to occupy all available transmission resources until time τ3. At time (or shortly before) τ1, an URLLC packet arrives and it needs to be transmitted immediately. If there are no other available transmission resources, it can then occupy a portion of the eMBB resources as shown in FIG. 5 until time τ2. Different methods for multiplexing the two types of transmissions using resources originally allocated for one of the transmissions only include:

- Superposing: The base station schedules the eMBB in the most efficient way, for example with long scheduling intervals as discussed with respect to FIG. 3. Then when a URLLC transport block arrives, this is superposed (for example by use of multi-user superposition) on the eMBB transmission. This means that the eMBB transmission would then suffer from some multi-user superposition interference on those resource elements shared with the URLLC transport blocks. This can result potentially in both the eMBB and the URLLC transmissions being corrupted.
- Puncturing: The eNodeB schedules the eMBB in the most efficient way, for example with long scheduling intervals as above. Then the eNodeB punctures the eMBB transmission to create space to fit the arriving URLLC transport block. This means that some of the transmission resources previously designated for use by the eMBB transport blocks are allowed to be used for transmitting URLLC transport blocks instead. The eMBB samples that were designated to be transmitted on the punctured transmission resources are not transmitted at all and are effectively removed from the transmission.

Superposing or puncturing an eMBB transmission as discussed above would affect the likelihood of the eMBB transmission being safely received or recovered and this may lead to a failed transmission. Some possible methods to ensure recovery of the eMBB TB include:

- Use of an existing HARQ retransmission scheme (or similar) for the eMBB packet to request retransmission of the data was too corrupted to be recovered. However unlike other transmissions (e.g. legacy LTE packet transmission), eMBB transmissions can be resource intensive and the retransmission would occupy a large portion of the available resources. This would result in a large number of resources being required for retransmitting the corrupted data (which may be much larger than the resources used for the URLLC transmission).
- Use outer layer coding, where additional coding is performed on multiple eMBB packets.

However this would introduce high latency in receiving the eMBB packets since the UE needs to receive several eMBB packets in order to perform the outer layer decoding process and since the eMBB frames for sending EMBB packets is expected to be relatively long.

It will thus be appreciated that in these cases, the collision between the eMBB data and the URLLC data is such that this may not be satisfactorily addressed and that the eMBB transmission may not be easily recovered without causing further problems.

Figure 6:
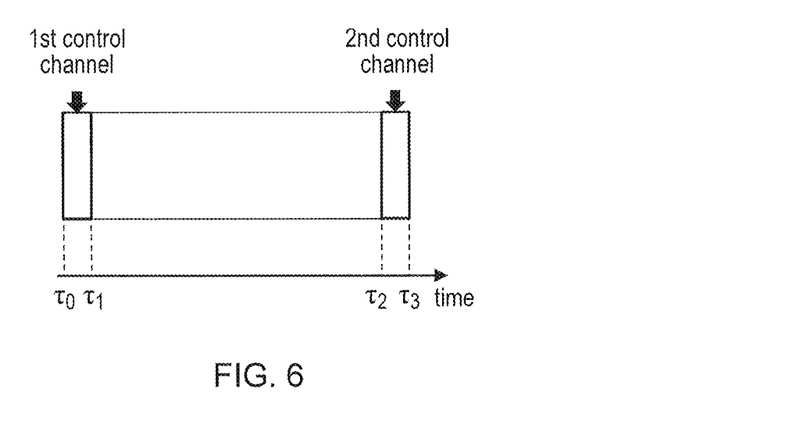
FIG. 6 schematically represents an example frame in accordance with the present disclosure.

In accordance with the present disclosure there is provided an arrangement where second control information is transmitted relating to the use of past resources in the same or in a previous frame. By providing an additional control channel, the recipient of the eMBB transmission can be notified of the collision with the URLLC transmission and/or of changes in the transmission of the eMBB data. In turn this can improve the recovery of the eMBB data affected by the URLLC transmission. Viewed from a different perspective, the second control channel can provide scheduling and decoding information updates to the data transmission and in particular to past transmissions. An example frame with two control channels is illustrated in FIG. 6, where an eMBB transmission starts at time $\tau_0$ and ends at time $\tau_3$. The transmission contains a first control channel transmitted between time $\tau_0$ and $\tau_1$ in a conventional manner, and a second control channel transmitted between time $\tau_2$ and $\tau_3$. In this example time period $[\tau_2\text{-}\tau_3]$ is at the end of the frame but in other examples it may be provided in an earlier time period of the frame or even in a subsequent frame. In other words, in some examples the data channel is transmitted between the first and the second control channels and in other examples it is transmitted after the first control channel and transmitted in part before and in part after the second control channel. Also, in other examples, three or more control channels may be transmitted within a single eMBB frame/transmission, for example to accommodate two or more collisions with URLLC transmissions or for any other appropriate reason.

While the second control channel may be used in every frame, it is expected that it would only be used in cases where the eMBB transmission has been affected, with a view to reducing the overhead from the second control channel. Accordingly, in one example when no URLLC transmission collision has occurred, the second control is not sent and the eMBB frame comprises only one control channel (e.g. as in FIG. 3). This corresponds to a conventional case where in each frame, control information is sent first, the control information comprising control information in respect of data transmitted in the subsequent data channel and, once the control channel has been transmitted, the corresponding data channel is transmitted. In accordance with the present disclosure, if a collision has occurred and has affected the eMBB transmission, second control information can then be sent after the data channel transmission has started where this second control information can be used to assist the eMBB recipient receiving the eMBB data, either in full or the part not affected by the collision. The second control information then relate to at least some of the resources already allocated, scheduled or dealt with in the first control information.

In some examples, there is a predefined set of possible locations of the URLLC channel. For example when the transmission time of the eMBB channel is 1 ms and the transmission time of the URLLC channel is 0.25 ms, when the URLLC transmissions are synchronised with the eMBB transmissions, there are four possible starting locations of the URLLC channel from a time perspective. The frequency resources allocated to the URLLC transmissions can also be selected as deemed appropriate. In some cases, the entire bandwidth allocated to eMBB transmissions may be used while in other examples the URLLC transmissions can use a subset of the eMBB frequency resources. Returning to timing considerations, depending on where the URLLC transmissions may be found, there can then be some possible restrictions on the location of the second control channel. This stems from the fact that the second control information will be expected to be sent after the collision as the low latency transmission is inserted while the eMBB transmission is ongoing and the eMBB recipient(s) can then be informed of the collision or changes in the eMBB transmission. Example possible locations of the second control channel include:

The end of the eMBB transmission
 at the start of the last possible URLLC transmission within the eMBB transmission (i.e. at 0.75 ms in the above example). The second control information can then potentially relate to past and/or coming collisions with URLLC traffic in the eMBB frame.
 in a case where two or more additional control channels are transmitted in the eMBB frame, such additional control channel may be provided at each possible starting location of URLLC transmissions (i.e. at 0.25 ms, 0.5 ms and 0.75 ms).

As the skilled will appreciate, other possible locations for the second control channel(s) may be suitable and used in accordance with the present disclosure, wherein the second control channel(s) can update control information previously sent to accommodate for an urgent use of resources, that were previously allocated to other traffic, for low latency traffic.

Figure 7:
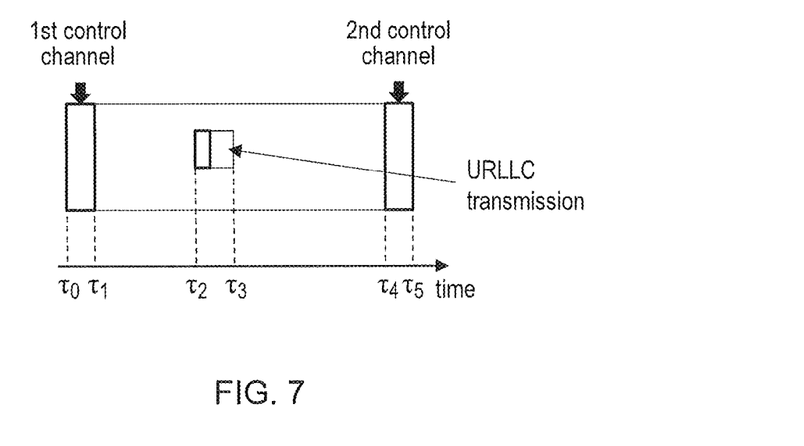
FIG. 7 schematically represents an example multiplexing of eMBB and URLLC transmissions in accordance with the present disclosure.

In one example embodiment, the first control channel contains "initial" scheduling information for the data channel, for example, the time and frequency resources used and MCS (modulation and coding scheme), and the second control channel contains "concluding" scheduling information providing further scheduling information, e.g. whether a subset of the data channel resources have been punctured. A frame according to this example is illustrated in FIG. 7. In this example, an eMBB transmission occupies the time resource between time $\tau_0$ and $\tau_5$. The first control channel that is transmitted at the beginning of the transmission frame structure between time $\tau_0$ and $\tau_1$, contains initial scheduling information identifying the resources occupied by the data channel and the MCS used by the data channel. At this point in time, when the control information is sent, it may not be known whether URLLC transmissions will take place and the scheduler can thus decide to allocate resources to eMBB transmission ignoring potential future URLLC transmissions. In this example, a downlink URLLC transmission then occurs between time $\tau_2$ and $\tau_3$, which punctures a portion of the eMBB data channel. The URLLC transmission can include its own control channel and information, such as scheduling information in the resources it is using from the eMBB data channel such that the URLLC recipient can receive the transmission in accordance with the URLLC system.

A second control channel provides scheduling information on which portion (e.g. frequency and time) of the data channel resources have been affected (for example punctured or superposed) by the URLLC transmission that was not originally planned when previous control information was sent. The eMBB terminal, with the knowledge of the affected eMBB resources can therefore avoid the corrupted resources in its decoding process. Viewed differently, discarding affected or corrupted symbols can assist in providing a higher performance compared to decoding the transmission using the affected or corrupted symbols in the decoding process. Accordingly, the time and frequency resources can be used more efficiently.

It is noteworthy that when comparing whether to use all the symbols or to discard or ignore the symbols identified as corrupted:
  in the "discarding corrupted symbols" case, the terminal's decoder can replace the corrupted demodulated samples resulting from the corrupted symbols with zero log-likelihood ratios ("LLR=0").
  In the "decoding using the corrupted symbols" case, the terminal's decoder does not alter the demodulated samples, and can only rely on the raw performance of the error correcting codes to correct the errors caused by the corruption.

As mentioned above, the skilled person will appreciate that in the event that no URLLC transmission is transmitted using resources previously allocated to one or more eMBB transmissions, the first control channel is sufficient for the UE receiving the eMBB transmissions to decode the data channel. For example, when allocating eMBB resources, the scheduler can allocate resources that may be used for URLLC transmissions last, so as to reduce the likelihood of conflict between the two types of transmissions. In this case, eMBB and URLLC transmissions may be multiplexed without conflict if there is enough capacity and if the timing of the transmissions allows it. In turn, even if eMBB and URLLC transmissions are multiplexed in the same frame, one control channel for the frame may then be sufficient (and the URLLC transmissions would generally be expected to be self-contained and to have its own control channel as illustrated in FIG. 7).

While in the previous example the second control information was used mainly to inform the terminal receiving corrupted eMBB data to ignore the corrupted symbols as the eMBB transmission has been changed to replace the corrupted symbols with symbols for an URLLC transmission, in other examples the second control channel can be used differently to assist with rectifying the conflicts between the two transmissions. Some of these examples are discussed below.

In one example, the first control channel contains scheduling information of the data channel. The second control channel contains scheduling information for any relevant transmission (eMBB and/or URLLC) that occupies resources within the data channel. This may be used when a URLLC transmission is superposed onto an eMBB data channel, thereby causing interference. A UE that is capable of interference cancellation can therefore remove the interference caused by the URLLC transmission (which was not known when the first control channel was transmitted and thus could not be notified to the terminal at this stage) using information provided by the second control channel. The information provided in the second control channel can for example include URLLC scheduling information (e.g. identifying the resources used for the URLLC transmission) and/or information required for interference cancellation such as modulation, superimposition power level, etc. of the URLLC transmission. Accordingly, second control information may be provided wherein the information is for carrying interference cancellation when the URLLC transmission has been superimposed to the eMBB transmission.

In some examples, the first control channel contains physical scheduling information (e.g. a Physical DCI in a downlink case) providing information for the UE to demodulate the data channel. The information can for example include the time and frequency resources occupied by the data channel and the modulation used. With the Physical DCI (the first control channel), the UE would obtain the LLR (soft bits), which it can store in its buffer. The second control channel contains transport scheduling information (e.g. a Transport DCI in a downlink case), indicating the coding rate and the actual resources used in the data channel (that is the resources not corrupted by URLLC transmission). The UE can then use the information in the Transport DCI to decode the demodulated signals (i.e. the LLR obtained using the information in the first control channel). Accordingly, the eMBB transmission may be sent such that the same amount of data from higher level is sent, but a different coding (and/or transmission) rate may be used to accommodate or compensate for the resources now lost to the other (URLLC) transmission.

In a case where the second control information is used to send transport information, e.g. a transport DCI, the transport information can indicate the rate matching used in different portions of the eMBB transmission, which can be varied to accommodate the URLLC transmission. For example, if the eMBB transmission has a duration of 1 ms and the URLLC transmission occupies at least some of the physical resources of the frame between 0.5 ms and 0.75 ms, the transport information may indicate that:
  From 0 ms to 0.5 ms, the code rate applied is 0.5
  From 0.5 ms to 1 ms, the code rate applied is 0.6 (i.e. there is an increased code rate used in order to account for some physical resource being reassigned to URLLC)

The second control information may also comprise an indication of the resources used for the URLLC transmission so that the terminal may decode all of the originally allocated resources before 0.5 ms at the first code rate, and the resources actually used for the eMBB transmission (i.e. excluding the resources used for the URLLC transmission from the originally allocated resources) between 0.5 ms and 0.75 ms at the second code rate.

Figure 8:
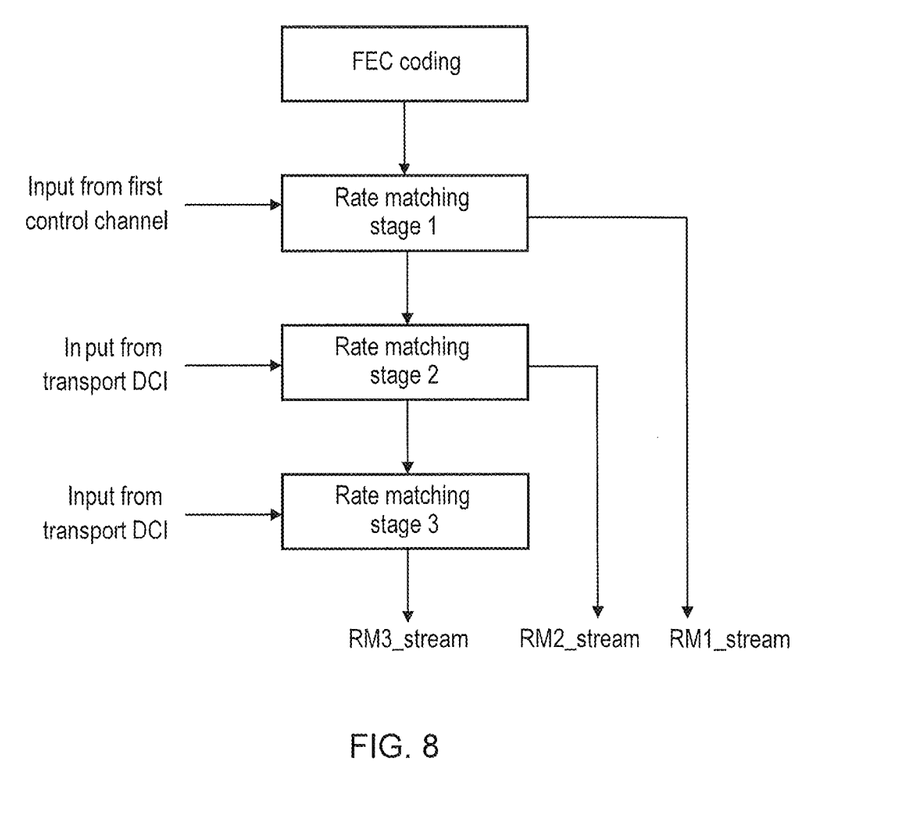
FIG. 8 schematically represents an example flowchart for rate matching a transmission in accordance with the present disclosure.

An example method of changing the code rate of the transmission is to have multiple subsequent rate matching stages in the transport channel processing chain for transmitting the data. The first rate matching stage rate matches the transmission to the amount of physical resource assuming that no resources will be used for a URLLC transmission and subsequent rate matching stages allow for the effect of puncturing by/conflict with URLLC transmissions. The number of subsequent rate matching stages can be up to the number of possible locations that URLLC can puncture the eMBB transmission. It will be appreciated that if URLLC transmissions do not puncture the eMBB transmission, then the "subsequent rate matching stages" may not happen. FIG. 8 illustrates a portion of a transmit transport channel processing chain that can be used when multiple rate matching stages are applied. RM1_stream is used for the initial part of the transmission, before one or more URLCC transmissions have to be transmitted using one or more resources previously allocated to the eMBB transmission. RM2_stream is used for the portion of the transmission that occurs after (and including) the first URLLC transmission, RM3_stream is used for the portion of the transmission that occurs after (and including) a second URLLC transmission. It is noteworthy that the portion of the transmission with an adapted code rate can potentially start before the corresponding URLLC transmissions, depending on the convention agreed on for the network. For example in a case where a URLLC transmission is sent at least some of the physical resources of the frame between 0.5 ms and 0.75 ms, the eMBB transmission could potentially start using a new code rate at 0.45 ms or 0.4 ms or at any other suitable time before 0.5 ms if appropriate (or 0.5 ms if appropriate).

Figure 9:
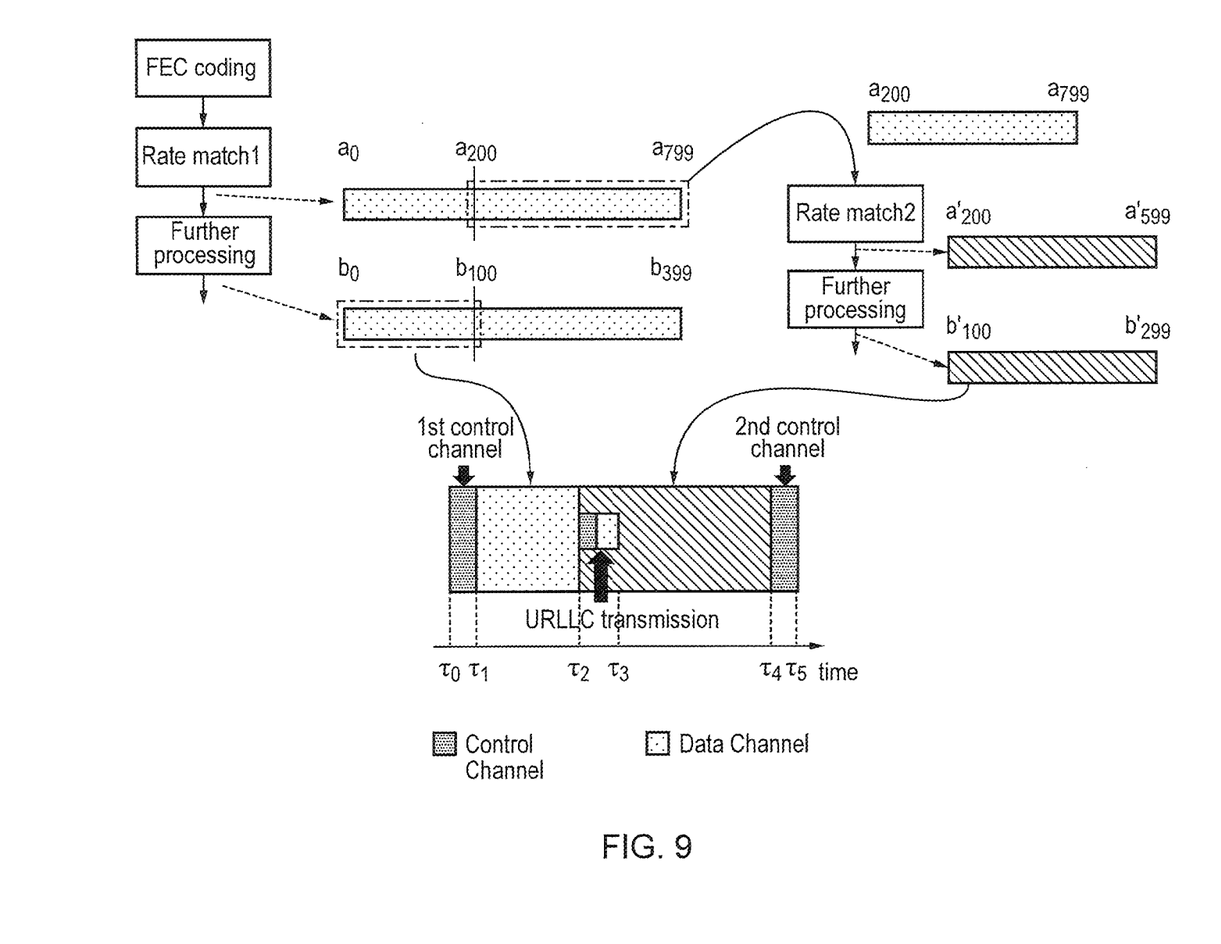
FIG. 9 schematically represents an example application of the flowchart discussed in FIG. 8.

FIG. 9 illustrates in more detail how the rate matching example discussed above with reference to FIG. 8 can operate in the time domain in a specific example. The figure illustrates an example where:

- A transport channel processing chain (top left), comprise FEC coding (e.g. Turbo coding), a "rate match 1" stage and "further processing" (where the further processing can for example include modulation, resource element mapping etc.).
- A set of bits produced by the "rate match 1" function, labelled $a_0$ to $a_{799}$.
- A set of modulation symbols labelled $b_0$ to $b_{399}$. In this example the modulation scheme is a QPSK modulation, where 2 bits are mapped to one modulation symbol (although the present disclosure is not limited to this type of modulation or bit/symbol rate).
- Up to time $\tau_2$, bits $a_0$ to $a_{199}$ are mapped to modulation symbols $b_0$ to $b_{99}$ which are then mapped to physical resource in the first portion of the time unit before the URLLC transmission.
- Before $\tau 2$ (and most likely not long before $\tau 2$ and thus most likely between $\tau 1$ and $\tau 2$), a decision is made to schedule a URLLC transmission and the remaining bit stream $a_{200}$ to $a_{799}$ is sent to the "rate match 2" function for a second rate matching stage operation.
- In this example, the URLLC transmission will have to occupy 100 resource elements (modulation symbols). There are thus 100 modulation symbols fewer available for the eMBB transmission and the bitstream $a_{200}$ to $a_{799}$ thus has to be punctured (via rate matching) by 200 bits (equivalent to 100 modulation symbols).
- The rate for the rate match 2 function is selected to rate match the bit stream $a_{200}$ to $a_{799}$ to produce the bit stream $a'_{200}$ to $a'_{599}$, thereby reducing the number of bits by 200 and thereby freeing resources for the URLLC transmission.
- The "further processing" function produces 200 modulation symbols $b_{100}$ to $b_{299}$ which exactly fit into the remaining resources of the frame once the URLLC resources have been used for the URLLC transmission.

With this example, while the symbols of the eMBB transmission are not replaced by symbols of the URLCC transmission (i.e. there is not actual loss of eMBB data even with the insertion of the URLLC symbols), the eMBB symbols transmitted with an adapted rate matching will effectively be more sensitive to transmission errors and can thus also be affected by the insertion of the URLLC transmission in the frame not originally scheduled with a planned URLLC transmission. As the skilled person will appreciate, the errors will however be evenly spread across the remainder of the eMBB resources ($b'_{100}$ to $b'_{299}$ in the example of FIG. 9) rather than being limited to the symbols replaced by or superimposed with the URLLC transmission in some of the other cases. This is expected to lead to better FEC decoding performances and thus to improve the efficiency of the network.

As previously mentioned, the present disclosure is not limited to the frame structures or types of data discussed in the examples above. For example, the two (or more) control channels or sets of control information are not restricted to control relating to eMBB transmissions and transmissions other than URLLC can collide with a subset of the resources in the data channel. While the problem is particularly relevant to eMBB and URLLC due to the nature and expected use of these services, the teachings provided herein may be used with any other suitable types of transmissions. In some examples, the new transmission puncturing/colliding with the previously allocated transmission may be of the same type as the previously allocated transmission.

Also, as discussed above, there can be more than one collisions within a time unit (e.g. frame or sub-frame), and this is even more likely to occur with large data channel transmission frames. The second control channel(s) can then provide information for one or more than one of the collisions. There can be a limit to the number of such collisions that can be indicated by the capacity of the second control channel.

From the perspective of the URLLC terminal, it would generally be expected that the URLLC (or more generally the transmissions colliding with pre-scheduled transmissions) would be transmitted at predefined time periods such that the terminal can attempt to decode a control channel at the relevant time period. If it can decode a control channel then it can decode the corresponding data channel (and is likely unaware of whether these control and data channels are using resources originally allocated for another transmission). Otherwise it can wait for the next relevant time period.

In another example the terminal can first attempt to decode the data channel with scheduling information provided by the first control channel. If it manages to decode it (e.g. pass a CRC check), then the terminal may ignore the second control channel. If however it fails to decode the data channel correctly, it can then read the second control channel to improve its decoding process.

In an example, the inclusion of a second control channel is decided by the network such that it can only be included in cases where it is believed that it is likely to be used. Typically the control channel has a small overhead on eMBB transmission such that the network is likely to decide to reserve resources for the second data channel for accommodating potential puncturing of the transmissions in the frame. However, if the network does not expect an eMBB transmission frame to contain many URLLC transmissions compared to the number of unallocated resources, it may then decide not to reserve resources for the second control information/channel. For example if the network determines that there are sufficient orthogonal frequency resources available for URLLC and eMBB transmissions, based on an expected number of URLLC transmissions, the network can dispense with the second control channel. In some cases, the indication of the presence/absence of the second control channel can be indicated by higher layer signaling or by layer 1 signalling (e.g. it can be indicated in the first control channel).

In these cases, it would generally be expected that the inclusion of a second control channel would have already been decided when the first control channel is transmitted and when the resources have been allocated for the frame (before any potential puncturing). However in some cases it may be decided after the determination/transmission of the first control channel that a second control channel should be transmitted and/or the transmission of the second control channel may not be notified to the terminals. In these examples, terminals may be expected to try to decode one or more potential control channel locations to determine whether one or more further control channels are being transmitted. In other words, the presence or absence of a second control channel is blind decoded by the terminal wherein the terminal can make two attempts to decode the eMBB data: first assuming that the second control channel exists and then assuming that there is no control channel. However, it is expected that in most cases, the terminal would first decode a received transmission assuming that the second control channel is not provided. Then, if first decoding attempt fails, look for a second control channel for example by decoding a potential second control channel and testing its CRC. If CRC test passes, then the data can be re-decoded taking into account what was signalled in second control channel. On the other hand, if the second control channel CRC test fails, the terminal may decide to use the data HARQ procedures (as the failure could for example not be related to a second control channel or URLLC multiplexing but to an otherwise corrupted transmission).

As mentioned above, the network can provide more than two control channels. If for example the puncturing traffic requires less than 0.25 ms of delay between the packet being incoming and the packet being transmitted and if the time unit for eMBB transmissions is 1 ms, the eMBB transmission may be punctured twice or more if necessary, depending on the number and timing of incoming URLLC transmissions. This example also recognizes that a single (additional) control channel can indicate a limited number of (URLLC) transmission collisions within a large data channel (e.g. eMBB transmission) and that sometimes the network can transmit more control channels if multiple/a large number of collisions occur. In some examples the presence of further control channels can be indicated in a previous control channel. For example, the second control channel can indicate to the UE the presence of (and possibly location of) a third control channel and the terminal can therefore read the third control channel to obtain further scheduling information.

Also, the discussions above have generally been presented in the context of transmissions to one terminal being punctured however, as the skilled person will appreciate, the same principles apply if the transmissions to two or more terminals are being punctured. For example, the URLLC transmission may use some resources originally allocated for a data transmission to a first terminal or group of terminals as well as other resources originally allocated for a data transmission to a second terminal or group of terminals. In effect, it is not relevant to the recipient(s) of a punctured transmission that other transmissions might have been punctured as well, what is relevant to the recipient is which of its resources have been used to send other data instead of its data or superimposed with its data. This applies for whether transmissions to the URLLC terminal puncture or are superposed on the eMBB transmission. If superposed on eMBB, the URLLC terminal is for example be considered as being the "far" terminal so that it can receive without superposition interference cancelation. Likewise, for the URLLC recipient, this recipient is unaware of whether the resources used for the URLLC transmission were originally allocated to another transmission, let alone whether they were allocated to two or more transmissions to different recipients. The principles above can thus be applied equally to puncturing/superposition of transmissions to different recipients.

Also, in the examples above, it is generally expected that the second control information will be sent in the same time unit/frame as the first control information (in the first control channel). However, in some examples the second control information may be sent in subsequent time units/frames, for example in the control channel for the next frame. The additional control information would still be notifying a terminal or group of terminals that resources previously allocated to them have been used for another transmission and these resources would be resources in a previous frame. While this is conceivable and may be advantageous in some situations (e.g. it can avoid changing the frame structure), it can also delay the time when the terminal can complete the decoding of a frame. It will in particular mean that the terminal would potentially have to wait for one or more subsequent frames before it can decode a frame already received in full which create delays. Also, this would result in increased interactions between different frames, rather than having self-contained frames which can lead to a more complex implementation for the terminal. It is thus expected that while possible and while preferable in some situation, this is unlikely to be more attractive as an alternative than providing the second control information in the same time unit as the first control information and as the data.

As the skilled person will appreciate, the terms terminal, UE, mobile device, mobile terminal, etc. can be used interchangeably and are not intended to be limiting. Likewise, the term base station has generally been used and is intended to include at least BTS, eNB, TRP, etc.

While the invention has generally been discussed in the context of downlink transmissions, it will be appreciated that the same principles may be used for uplink transmissions. However, the two types of data (the punctured and puncturing data) would have to be transmitted by the same mobile unit (e.g. terminal) for the mobile unit to puncture the original transmission and to send second control information to correct the allocation of uplink resources previously allocated for the transmission.

Thus there has been described [claim 1/abstract].

While some frame structures with more than one control channel had already been considered in a different context and when trying to address different problems, these control channels are used for different purposes, for example a first downlink control channel for downlink scheduling and a second uplink control channel for ACK/NACK feedback. In contrast the present disclosure relate to multiple control channels all used for the scheduling and decoding of the same data channel and in the same uplink/downlink direction. In other words there types of control channels are remote from the control channels discussed herein, both in their purpose and nature.

Also, HSDPA can support two rate matching stage where the first rate matching stage rate matches to the soft buffer capability of the UE and the second rate matching stage matches an amount of physical resource available for the HS-DSCH transmission. In contrast, in this disclosure, the rate matching stages rate match to different amounts of physical resource (since the amount of available physical resource changes if and when URLLC data collides with eMBB data). Again, the types of rate matching previously proposed are entirely different from those discussed herein and are for addressing entirely different problems.

Further particular and preferred aspects of the present invention are set out in the accompanying independent and dependent claims. It will be appreciated that features of the dependent claims may be combined with features of the independent claims in combinations other than those explicitly set out in the claims.

It will further be appreciated that the principles described herein are not applicable only to LTE-based or 5G-based wireless telecommunications systems, but are applicable for any type of wireless telecommunications system that supports transmission of different types of data and via the use of control channels and data channels, the control channels being used for allocating resources in the data channels.

Thus, the foregoing discussion discloses and describes merely illustrative embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

In the present disclosure, method steps discussed herein may be carried out in any suitable order and not necessarily in the order in which they are listed. For example, steps may be carried out in an order which differs from an order used in the examples discussed above or from an indicative order used anywhere else for listing steps (e.g. in the claims), whenever possible or appropriate. Thus, in some cases, some steps may be carried out in a different order, or simultaneously (entirely or in part) or in the same order. So long as an order for carrying any of the steps of any method discussed herein is technically feasible, it is explicitly encompassed within the present disclosure.

As used herein, transmitting information or a message to an element may involve sending one or more messages to the element and may involve sending part of the information separately from the rest of the information. The number of "messages" involved may also vary depending on the layer or granularity considered. For example transmitting a message may involve using several resource elements in an LTE environment such that several signals at a lower layer correspond to a single message at a higher layer. Also, transmissions from one terminal to another may relate to the transmission of any one or more of user data, discovery information, control signalling and any other type of information to be transmitted.

Also, whenever an aspect is disclosed in respect of an apparatus or system, the teachings are also disclosed for the corresponding method. Likewise, whenever an aspect is disclosed in respect of a method, the teachings are also disclosed for any suitable corresponding apparatus or system. Additionally, it is also hereby explicitly disclosed that for any teachings relating to a method or a system where it has not been clearly specified which element or elements are configured to carry out a function or a step, any suitable element or elements that can carry out the function can be configured to carry out this function or step. For example any one or more of a mobile terminal, a base station or any other mobile unit may be configured accordingly if appropriate, so long as it is technically feasible and not explicitly excluded.

Whenever the expressions "greater than" or "smaller than" or equivalent are used herein, it is intended that they discloses both alternatives "and equal to" and "and not equal to" unless one alternative is expressly excluded.

It is noteworthy that even though the present disclosure has been discussed in the context of LTE and/or 5G, its teachings are applicable to but not limited to LTE, 5G or to other 3GPP standards. In particular, even though the terminology used herein is generally the same or similar to that of the 5G standards, the teachings are not limited to the present version of 5G and could apply equally to any appropriate arrangement not based on 5G and/or compliant with any other future version of an 5G or 3GPP or other standard.

Respective features of the present disclosure are defined by the following numbered paragraphs:

Paragraph 1. A method of transmitting data in a mobile communications network, the method comprising:
transmitting first data to a first mobile unit wherein transmitting the first data comprises:
transmitting first control information in a first time period, the first control information identifying first allocated resources for transmitting the first data in a subsequent second time period;
identifying second data to be transmitted to a second mobile unit in the second time period;
upon identification of the second data:
transmitting the second data in second resources, wherein the second resources comprises a set of re-allocated resources selected from the first allocated resources, the second data being transmitted in a selected time period within the second time period;
transmitting second control information, the second control information notifying the first mobile unit of the transmission of data other than the first data in the set of re-allocated resources originally allocated for the transmission of the first data.

Paragraph 2. The method of Paragraph 1 wherein the first time period is a time period at the beginning of a transmission frame for transmitting the first data and/or wherein the second control information is transmitted in a time period between the end of the first time period and the end of a transmission frame for transmitting the first data.

Paragraph 3. The method of any preceding Paragraph wherein the second control information notifies the first mobile unit that the transmissions for the first data in the set of re-allocated resources have been replaced by transmissions for other data.

Paragraph 4. The method of any one of Paragraphs 1 to 2 wherein the second control information notifies the first mobile unit that the set of re-allocated resources have been allocated to another data transmission and that a transmission rate for the transmission of the first data has been adapted for transmitting at least part of the first data in the second time period to accommodate for the loss of the set of re-allocated resources.

Paragraph 5. The method of Paragraph 4 comprising the first mobile unit decoding the transmission of the first data in the remaining allocated resources, the remaining allocated resources being the first allocated resources which are not also comprised in the set of re-allocated resources, wherein the decoding comprises:
using a first transmission rate for the transmission of the first data up to a certain time on or before the start of the selected time period and
using a second transmission rate for the transmission of the first data after the certain time until the end of the second time period.

Paragraph 6. The method of any preceding Paragraph wherein the first mobile unit is a first mobile communications device and the second mobile unit is a second mobile communications terminal, the second mobile communications terminal being the same as or different from the first mobile communications terminal.

Paragraph 7. The method of any one of Paragraphs 1 to 5, wherein the first mobile unit is a first base station and the second mobile unit is the first base station.

Paragraph 8. The method of any preceding Paragraphs wherein:
The first control information identifies third allocated resources for transmitting third data in the second time period, wherein the second resources comprises a further set of re-allocated resources selected from the third allocated resources; and the second control information notifies the third mobile unit of the transmission of data other than the third data in the further set of re-allocated resources originally allocated to the transmission of the third data.

Paragraph 9. A method of receiving data at a mobile unit in a mobile communications network, the method comprising:

receiving first control data information in a first time period, the first control information identifying first allocated resources for transmitting first data to the mobile unit in a subsequent second time period;

receiving one or more signals transmitted in some of or all the first allocated resources;

receiving second control information, the second control information notifying the mobile unit of the transmission of data other than the first data in a set of re-allocated resources part of the first allocated resources originally allocated to the transmission of the first data; and ignoring the signals transmitted in the set of re-allocated resources identified in the second control information.

Paragraph 10. The method of Paragraph 9 wherein ignoring the signals transmitted in the set of re-allocated resources comprises at least one of:

discarding one or more signals already received in some or all of the set of re-allocated resources; and disregard signals to be received in resources of the set of re-allocated resources.

Paragraph 11. The method of one of Paragraphs 9-10 further comprising receiving in the second control information that an adapted transmission rate has been used for transmitting the first to accommodate for the loss of the set of re-allocated resources;

decode the signals received in the remaining allocated resources, the remaining allocated resources being the first allocated resources which are not also comprised in the set of re-allocated resources, wherein the decoding comprises:

using a first transmission rate for the signals received up to a certain time on or before the start of the set of re-allocated resources; and using a second transmission rate for the signals received after the certain time until the end of the second time period.

Paragraph 12. A method of receiving data at a mobile unit in a mobile communications network, the method comprising:

receiving first control data information in a first time period, the first control information identifying first allocated resources for transmitting first data to the mobile unit in a subsequent second time period;

receiving one or more signals transmitted in some of or all the first allocated resources;

receiving second control information, the second control information notifying the mobile unit of the transmission of data other than the first data in a set of re-allocated resources part of the first allocated resources originally allocated to the transmission of the first data; and performing, based on the second control information, interference cancellation for the signals transmitted in the set of re-allocated resources identified in the second control information with a view to recovering the signals transmitted for the first data in the set of re-allocated resources.

Paragraph 13. A mobile unit for use in a mobile telecommunications system, the apparatus being configured to carry out the method of any one of Paragraphs 1 to 5 and 7 to 12.

Paragraph 14. A mobile unit for use in a mobile telecommunications system, the mobile unit comprising a controller and a transmitter, the controller being configured to:

transmit, via the transmitter, first data to a first mobile unit wherein the controller being configured to transmit the first data comprises the controller being configured to transmit first control information in a first time period, the first control information identifying first allocated resources for transmitting the first data in a subsequent second time period;

identify second data to be transmitted to a second mobile unit in the second time period;

upon identification of the second data:

transmit, via the transmitter, the second data in second resources, wherein the second resources comprises a set of re-allocated resources selected from the first allocated resources, the second data being transmitted in a selected time period within the second time period;

transmit, via the transmitter, second control information, the second control information notifying the first mobile unit of the transmission of data other than the first data in the set of re-allocated resources originally allocated to the transmission of the first data.

Paragraph 15. A mobile unit for use in a mobile telecommunications system, the mobile unit comprising a controller and a receiver, the controller being configured to:

receive, via the receiver, first control data information in a first time period, the first control information identifying first allocated resources for transmitting first data to the mobile unit in a subsequent second time period;

receive, via the receiver, one or more signals transmitted in some of or all the first allocated resources;

receive, via the receiver, second control information, the second control information notifying the mobile unit of the transmission of data other than the first data in a set of re-allocated resources part of the first allocated resources originally allocated to the transmission of the first data; and ignore the signals transmitted in the set of re-allocated resources identified in the second control information.

Paragraph 16. A mobile unit for use in a mobile telecommunications system, the mobile unit comprising a controller and a receiver, the controller being configured to:

receive, via the receiver, first control data information in a first time period, the first control information identifying first allocated resources for transmitting first data to the mobile unit in a subsequent second time period;

receive, via the receiver, one or more signals transmitted in some of or all the first allocated resources;

receive, via the receiver, second control information, the second control information notifying the mobile unit of the transmission of data other than the first data in a set of re-allocated resources part of the first allocated resources originally allocated to the transmission of the first data; and perform, based on the second control information, interference cancellation for the signals transmitted in the set of re-allocated resources identified in the second control information with a view to recovering the signals transmitted for the first data in the set of re-allocated resources.

Paragraph 17. Circuitry for a mobile unit forming part of a mobile communications system, the mobile unit comprising a transmitter configured to transmit signals via a wireless access interface, a receiver configured to receive signals via the wireless access interface, and a controller configured to control the transmitter and the receiver to transmit and to receive signals via the wireless access interface, wherein the controller is configured in combination with the transmitter and the receiver to carry out the method of any one of Paragraphs 1 to 5 and 7 to 12.

REFERENCES

[1] RP-160671, "New SID Proposal: Study on New Radio Access Technology," NTT DOCOMO, RAN #71
[2] Holma H. and Toskala A, "LTE for UMTS OFDMA and SC-FDMA based radio access", John Wiley and Sons, 2009

What is claimed is:

1. A device, comprising:
processing circuitry configured to:
transmit first control information in a first time period in a first control channel of a transmission frame, the first control information identifying first allocated resources for transmitting first data to a first device in a second time period after the first time period;
transmit second data in second resources comprising a set of re-allocated resources selected from the first allocated resources, the second data being other than the first data and being transmitted to a second device in a selected time period within the second time period in the transmission frame;
after transmission of the second data is completed, insert a second control channel in the transmission frame and transmit second control information in the second control channel of the transmission frame, the second control information notifying the first device of the transmission of the second data in the set of re-allocated resources; and
based on the second control information, causing the first device to perform interference cancellation, for the signals transmitted in the set of re-allocated resources, by discarding one or more signals already received in some or all of the set of re-allocated resources.

2. The device according to claim 1, wherein
the first time period is a time period at the beginning of the transmission frame, and
the second control information is transmitted in the second control channel in a time period between the end of the first time period and the end of a transmission frame.

3. The device according to claim 1, wherein the second control information notifies the first device that the transmissions for the first data in the set of re-allocated resources have been replaced by transmissions for other data.

4. The device according to claim 1, wherein the second control information notifies the first device that the set of re-allocated resources have been allocated to another data transmission and that a transmission rate for the transmission of the first data has been adapted for transmitting at least part of the first data in the second time period to accommodate for loss of the set of re-allocated resources.

5. The device according to claim 4, wherein the first device decodes the transmission of the first data in remaining allocated resources, the remaining allocated resources being the first allocated resources which are not also comprised in the set of re-allocated resources, by:
using a first transmission rate for the transmission of the first data up to a certain time on or before the start of the selected time period, and
using a second transmission rate for the transmission of the first data after the certain time until the end of the second time period.

6. The device according to claim 1, wherein
the first device is a first mobile communications device, and
the second device is a second mobile communications terminal.

7. The device according to claim 1, wherein the first device is a first base station and the second device is also the first base station.

8. The device according to claim 1, wherein
the first control information identifies third allocated resources for transmitting third data in the second time period,
the second resources comprise a further set of re-allocated resources selected from the third allocated resources, and
the second control information notifies a third device of the transmission of data other than the third data in the further set of re-allocated resources originally allocated to the transmission of the third data.

9. A device, comprising:
processing circuitry configured to:
receive first control information in a first time period in a first control channel of a transmission frame, the first control information identifying first allocated resources for receiving first data by the device in a second time period after the first time period;
receive one or more signals transmitted in some of or all the first allocated resources;
after a second control channel is inserted in the transmission frame, receive second control information in the second control channel of the transmission frame, the second control information notifying the device of a transmission of second data other than the first data in a set of re-allocated resources that is part of the first allocated resources for transmission of the first data, and transmission of the second data is completed before the second control channel is inserted in the transmission frame; and
ignore the signals transmitted in the set of re-allocated resources by discarding one or more signals already received in some or all of the set of re-allocated resources.

10. The device according to claim 9, wherein
the first time period is a time period at the beginning of the transmission frame, and
the second control information is transmitted in the second control channel in a time period between the end of the first time period and the end of a transmission frame.

11. The device according to claim 9, wherein the second control information notifies the device that the transmissions for the first data in the set of re-allocated resources have been replaced by transmissions for other data.

12. The device according to claim 9, wherein the second control information notifies the device that the set of re-allocated resources have been allocated to another data transmission and that a transmission rate for the transmission of the first data has been adapted for transmitting at least part of the first data in the second time period to accommodate for loss of the set of re-allocated resources.

13. The device according to claim 12, wherein the processing circuitry decodes the transmission of the first data in remaining allocated resources, the remaining allocated resources being the first allocated resources which are not also comprised in the set of re-allocated resources, by:
using a first transmission rate for the transmission of the first data up to a certain time on or before the start of the selected time period, and using a second transmission rate for the transmission of the first data after the certain time until the end of the second time period.

14. The device according to claim 9, wherein
the first control information identifies third allocated resources for transmitting third data in the second time period,
the second resources comprise a further set of re-allocated resources selected from the third allocated resources, and
the second control information notifies another device of the transmission of data other than the third data in the further set of re-allocated resources originally allocated to the transmission of the third data.

15. A device, comprising:
processing circuitry configured to:
receive first control information in a first time period in a first control channel of a transmission frame, the first control information identifying first allocated resources for receiving first data by the device in a second time period after the first time period;
receive one or more signals transmitted in some of or all the first allocated resources;
after a second control channel is inserted in the transmission frame, receive second control information in the second control channel of the transmission frame, the second control information notifying the device of a transmission of second data other than the first data in a set of re-allocated resources that is part of the first allocated resources for transmission of the first data, and transmission of the second data is completed before the second control channel is inserted in the transmission frame; and
perform, based on the second control information, interference cancellation for the signals transmitted in the set of re-allocated resources to recover the signals transmitted for the first data in the set of re-allocated resources, wherein
performance of the interference cancellation includes discarding one or more signals already received in some or all of the set of re-allocated resources.

16. The device according to claim 15, wherein
the first time period is a time period at the beginning of the transmission frame, and
the second control information is transmitted in the second control channel in a time period between the end of the first time period and the end of a transmission frame.

17. The device according to claim 15, wherein the second control information notifies the device that the transmissions for the first data in the set of re-allocated resources have been replaced by transmissions for other data.

18. The device according to claim 15, wherein the second control information notifies the device that the set of re-allocated resources have been allocated to another data transmission and that a transmission rate for the transmission of the first data has been adapted for transmitting at least part of the first data in the second time period to accommodate for loss of the set of re-allocated resources.

19. The device according to claim 15, wherein the processing circuitry decodes the transmission of the first data in remaining allocated resources, the remaining allocated resources being the first allocated resources which are not also comprised in the set of re-allocated resources, by:
using a first transmission rate for the transmission of the first data up to a certain time on or before the start of the selected time period, and
using a second transmission rate for the transmission of the first data after the certain time until the end of the second time period.

20. The device according to claim 15, wherein
the first control information identifies third allocated resources for transmitting third data in the second time period,
the second resources comprise a further set of re-allocated resources selected from the third allocated resources, and
the second control information notifies another device of the transmission of data other than the third data in the further set of re-allocated resources originally allocated to the transmission of the third data.

* * * * *